United States Patent Office 3,256,179
Patented June 14, 1966

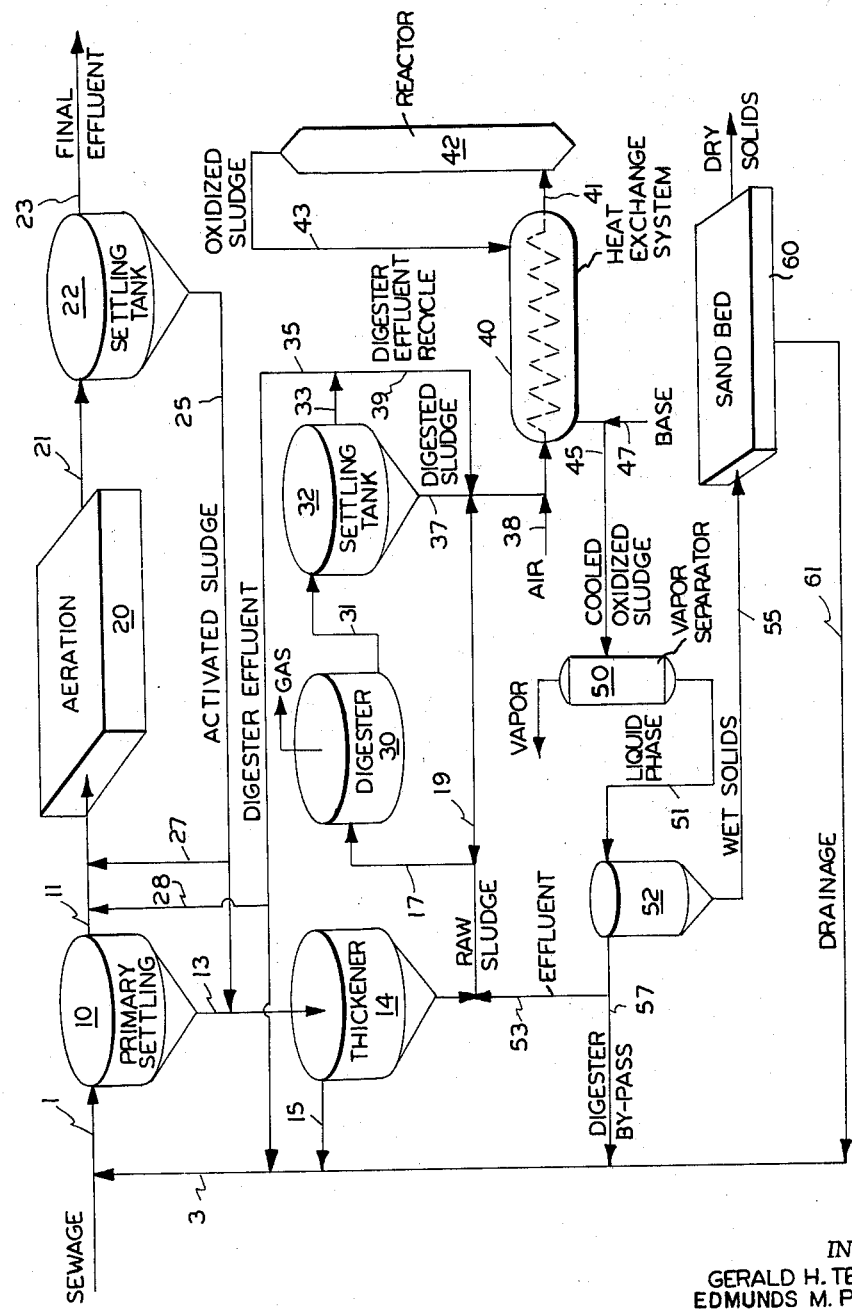

3,256,179
SEWAGE TREATMENT PROCESS
Gerald H. Teletzke, Wausau, and Edmunds M. Pogainis, Mosinee, Wis., assignors to Sterling Drug, Inc., New York, N.Y., a corporation of Delaware
Filed June 24, 1964, Ser. No. 377,695
8 Claims. (Cl. 210—8)

This invention relates to the treatment of sewage. More particularly the invention relates to a process for treating sewage sludge in a sewage plant employing a gas digester and a wet air oxidation system and to sewage plants employing such a process.

A conventional means of treating sewage sludges in modern sewage treatment plants to render them less noxious is with an anaerobic digester. In the digester, anaerobic organisms remove up to about half of the Chemical Oxygen Demand (C.O.D.) of the incoming sludge by converting a portion of the sludge to methane and carbon dioxide along with other metabolic products. The methane produced is ordinarily used as a source of power or heat.

A variety of problems can arise in a sewage plant employing a gas digester. A common one is insufficient sand bed, lagoon or mechanical filtration capacity. Another is digester effluent disposal, a problem particularly acute in the event of souring or poisoning of the gas digester. Another problem is disposal of the residual solids, still high in C.O.D. A further problem is insufficient digester capacity. When a digester sewage plant is equipped for power production, gas production below the consumption capacity of the power generating equipment creates the problem of below optimum plant efficiency. Still another problem is fluctuation in gas production, both from day to day and season to season, usually due to fluctuations in input loads to the digester. Another problem is the higher cost of and the operating difficulties associated with the more efficient heated digesters.

It is an object of this invention to eliminate or minimize the adverse effects of one or more of the above-mentioned problems.

Another object is to provide novel and useful new methods and plants for handling sewage sludge.

Other objects will be apparent to those skilled in the art to which this invention pertains.

According to this invention, the digested sludge from the digester of a gas producing sewage plant is subjected to a wet air oxidation at a temperature of at least about 120° C. under pressure in the presence at all times of excess gaseous oxygen so as to reduce by less than 55 percent the C.O.D. of the sludge, the residual undissolved solids and resulting effluent are separated, the former then being concentrated and at least a portion of the latter cooled to about 75–108° C. and the cooled portion returned to the digester, the amount of cooling being regulated so as to maintain the digester at a substantially constant temperature between about 30 and 60° C. when the effluent is returned to the digester, the amount of ammoniacal nitrogen returned to the digester by the effluent being regulated so as to maintain the ammoniacal nitrogen content of the digester at all times below 1.0 g./l., preferably between 0.1–0.5 g./l.

In the process of U.S. 3,060,118 the effluent from a wet air oxidation in which the C.O.D. of sewage sludge is reduced from 60 to 85 percent is returned as nutrient to a biological treatment. This system works well when the biological treatment is aerobic treatment. However, the effluent obtained from that process is a relatively poor nutrient medium for digester organisms. However, if the oxidation is conducted under conditions where less than 55 percent and more preferably 45 percent or less of the C.O.D. of the sludge is oxidized, the resulting effluent is more acceptable to the digester organisms. This can result in an increase in gas production. The digested sludge resulting from such recycling is lower in C.O.D. and thus more inert biologically.

This lower level of oxidation can be achieved by lower oxidation temperatures. For example, if the oxidation is conducted between 120° and 175° C., less than 10 percent oxidation is achieved in one hour at 160° and at 8 hours or longer at 120° C. Some degree of oxidation occurs at 120° C. or higher but at the lower limit, it is often one percent or less. Therefore, the oxidation preferably is conducted at between 120 and 165° C., e.g., 120° for 2–16 hours, 140° for 1–8 hours, 150° for up to 4 hours and 160° for one hour or less.

From the above, it can be seen another way of limiting the degree of oxidation is to employ temperatures which are capable of producing higher oxidation levels but limiting the oxidation time so that an oxidation level of less than 55 percent is achieved. For example, about 10 percent oxidation is achieved at about 175° and about 45 percent at 225° C. in 60 minutes. Therefore limiting oxidation times to less than 10 minutes at 120–200° C. and less than 5 minutes at 200–225° C. ordinarily will limit the oxidation to less than 55 percent.

Ordinarily, the oxidation should not be limited by reducing the oxygen gas input so that the oxygen is completely consumed as the resulting effluent is more toxic to digester organisms. Therefore, the oxidation should ordinarily be conducted in the presence at all times of excess gaseous oxygen, preferably an amount which leaves from 0.5 to 2.5 percent, e.g., 1–2 percent, gaseous oxygen in the gaseous phase of the oxidized mixture.

The oxidation is conducted in the manner described in U.S. Patents 2,665,249, 2,824,058, 2,903,425, 2,932,613 and 3,060,118 but employing reaction conditions whereby oxidation is limited to less than 55 percent. The term "wet air" is used to define the process as the oxidation is conducted in the presence of water under sufficient pressure to maintain a portion of the water in the liquid state.

The present process is employed in high temperature digester operation, i.e., 30–60° C., usually about 30–35° C. Such digester temperatures have heretofore presented operating difficulties because heat exchange efficiency rapidly drops when indirect heating is employed and undesirable dilution of the digester contents occurs when direct heating with steam is employed. Because the direct heating medium used in the present process is itself a nutrient, efficient direct heating without undesirable dilution is achieved. Because the wet air oxidation is conducted at a temperature in excess of that required to supply the heat energy necessary to maintain the digester at 30–60° C., the effluent is cooled to about 75–108° C., preferably about 80–105° C. before it is returned to the digester. Desirably at least a portion of this cooling is achieved by heat exchange with the feed mixture going to the oxidation zone so as to reduce the energy requirements of the oxidation. In continuous operation, the extent of cooling will depend upon the environmental temperature of the digester. In northern latitudes, a winter effluent temperature of about 99–105° C. is necessary whereas in summer operation a temperature of only about 75–80° C. is necessary. The cooled temperature is determined by the heat energy necessary to maintain the digester at a substantially constant selected temperature between 30–60° C.

Insoluble solids in the oxidized mixture are readily separable from the effluent by settling techniques. The wet, completely innocuous solids can easily be dried by conventional techniques, e.g., on a sand bed or by rotary drum vacuum filtration. Their soil-like properties make them well suited as a component in soil-conditioners and fertilizers.

In the process of this invention, conditions are regulated so as to maintain the ammoniacal nitrogen level of the digester contents below 1.0 g./l. This is achieved by one or a combination of two or more of the following ways:

(a) The oxidation temperature is varied inversely to the ammoniacal nitrogen level of the digester. It has been discovered the effluent from the oxidation is low in ammoniacal nitrogen when the oxidation is conducted at 120–150° C. and high at 175–225° C. Therefore, if the level approaches 1.0 g./l., a temperature below 175° C. and preferably 155° C. or lower is employed. Higher temperatures, e.g., 200° C. or higher, can be employed when the ammoniacal nitrogen level in the digester is below 0.8 g./l. In operation, ammoniacal nitrogen level in the digester is determined daily and the oxidation temperature selected which will maintain the nitrogen level in the digester below 1.0 g./l., preferably 0.1–0.5, e.g., 0.2–0.4 g./l.

(b) Alternatively, the dwell time of the oxidation mixture in the oxidation reactor can be varied in relationship to the ammoniacal nitrogen level of the digester, e.g., by increasing the pumping rate. If the same reaction temperature is to be maintained, external heat may have to be supplied to the heat exchange system, e.g., superheated high pressure steam. By reducing reaction time, the ammoniacal nitrogen level of the effluent is lowered. For example, if the oxidation is being conducted at 200° C. for one hour, reducing reaction time to fifteen minutes will reduce by up to one half the ammoniacal nitrogen content of the effluent.

(c) A further means of regulating ammoniacal nitrogen level in the digester is to vary the proportion of effluent returned to the digester. When the level approaches 1.0 g./l. and the ammoniacal nitrogen level of the effluent is above 1.0 g./l., only that amount of the effluent to the digester is returned as will maintain the level in the digester below 1.0 g./l. The remainder can be returned to the primary or aeration system or mixed with unoxidized digested sludge before its oxidation. Because this method of regulation varies the heat energy transferred to the digester, it is sometimes necessary to concurrently adjust the cooled effluent temperature so as to maintain the digester contents at the selected temperature in the manner described above.

(d) A fourth method of regulating ammoniacal nitrogen level in the digester is by removing at least a portion of the ammoniacal nitrogen in the effluent before returning the effluent to the digester. This can be accomplished by precipitation, oxidation, or evaporation, preferably the latter which can be achieved by venting the hot effluent under pressure down to about atmospheric pressure, which permits a portion of the ammoniacal nitrogen to escape with the steam, carbon dioxide and nitrogen gases. This volatilization is facilitated by adding a non-volatile base, e.g., caustic or lime, prior to venting so as to raise the pH of the effluent, which normally is about 4–6, to above 7, e.g., 10 to 11. If desired, the suspended solids can be separated first to reduce the amount of base required to do this. By removing a major proportion or all of the ammoniacal nitrogen from the effluent prior to its return to the digester a readily assimilable, non-toxic nutrient media is provided for the anaerobic organisms which results in a 10–25 percent or more increase in gas production.

Reference is made to the drawing in which FIGURE 1 is a schematic illustration of a digester plant embodying the process of this invention.

In the sewage plant shown in FIGURE 1, sewage enters the primary system by pipe 1, after passing through the conventional screens, etc., to primary settling tank 10. The settled solids from tank 10 are pumped through pipe 13 to the primary thickening tank 14. The primary effluent is pumped through pipe 11 to the aerobic aeration system 20 and then through pipe 21 to the final settling tank 22 where the now innocuous final effluent is discharged from the plant through pipe 23 and a portion of the settled activated slude is returned to the aeration system by pipes 25 and 27 and the remainder joins the settled solids from tank 10 by pipe 25. The effluent from thickener 14 is pumped through pipes 15 and 3 to the primary settling tank 10. The sludge obtained from thickening tank 14 is pumped through pipe 17 to digester tank 30 where a portion of the volatile solids are converted to methane and carbon dioxide. The digested solids are displaced from digester tank 30 through pipe 31 to settling tank 32 where the supernatant is separated from the digested solids. The digester effluent is pumped through pipes 33, 35 and 3 to primary settling tank 10 or through pipes 33, 35 and 28 to aeration system 20. The digested sludge is pumped through pipe 37, mixed with air from pipe 38 and the mixture pumped through the heat exchange system 40 where its temperature is raised to an oxidizing temperature. The hot mixture is pumped through pipe 41 to reactor 42 which provides the residence time required to achieve the desired degree of oxidation. The oxidized mixture is pumped through pipe 43 to the shell of the heat exchange system 40 where a portion of its heat is transferred to the incoming mixture. The partially cooled oxidized mixture is pumped through pipe 45, where optionally its pH is raised a selected amount by base supplied by pipe 47, to vapor separator 50 where the pressure of the mixture is dropped to about atmospheric and the vapor phase discharged from the system. The energy dissipated in so doing can be used to run turbines for power and the heat energy captured by heat exchangers for use in the system. The liquid phase with suspended solids is displaced through pipe 51 to solids separator 52 where the oxidized sludge solids are separated from the effluent. The effluent is pumped through pipes 53 and 17 to digester 30. The now innocuous separated solids are discharged through pipe 55 to sand bed 60 or other filtering system where, e.g., the final dried solids are separated from the residual liquid, which is returned to the primary settling tank 10 through pipes 61 and 3. Primary sludge can be passed directly to the heat exchange system through by-pass pipe 19. Digested sludge can be recycled to digester 30 through pipes 37, 19 and 17. Effluent from the digester settling tank 32 is passed to the heat exchange system when desired by pipes 39 and 37. Effluent from solids separator 52 is passed to primary settling tank 10 by by-pass pipe 57.

In a typical operation, 10 million gallons per day (m.g.d.) of raw sewage containing 10.4 tons of suspended solids having 8.35 tons of Biological Oxygen Demand (BOD) is pumped to tank 10, where effluent containing 4.16 tons of suspended solids with a BOD of 5.42 tons is separated from the remainder of the suspended solids. The aeration system 20 reduces to negligible values the BOD of this effluent, which is discharged from the plant as final effluent after separation from the resulting activated sludge in settling tank 22. The thickener tank 14 produces a primary sludge at a rate of 45,000 gallons per day (g.p.d.) containing 9.5 tons of suspended solids, of which 6.34 tons are volatile (organic) solids. This sludge, along with 19,950 g.p.d. of effluent from solids separator 52 containing 0.7 ton volatile solids, is pumped to digester tank 30 where the mixture is converted to gas, leaving a digested sludge which is separated from 43,500 g.p.d. of digested effluent in settling tank 32, the effluent being returned to the primary system. The 25,000 g.p.d. of digested sludge containing 3.16 tons each of ash and volatile solids is mixed with sufficient air to reduce the C.O.D. of the sludge by about 50 percent. The sludge-air mixture is passed through the heat exchange system 40 where its temperature is raised to 140° C. The hot mixture is then passed to reactor 42 where the mixture is maintained at an average temperature of 205° C. in the reactor 42 until half the C.O.D. of the mixture is eliminated by oxidation. The sludge-air ratio of the incoming mixture is continually adjusted so that the vapor phase of the oxidized mixture contains from 0.5 to 2.5 percent oxygen. The hot oxidized mixture is passed through the shell of the heat exchange system 40 where its temperature is lowered a regulated amount such that the effluent obtained from solids separator 52 has a temperature within the range of 75° to 105° C., depending upon whether the operation is summer or winter. The temperature of the hot effluent is regulated so that the digester is maintained at a constant 32° C. The hot mixture obtained from the heat exchange system 40 is reduced to about atmospheric pressure in vapor separator 50 by venting the vapor phase. The hot effluent obtained from solids separator 52, at a temperature which when mixed with the contents of the digester 30 maintains the mixture at 32° C., is recycled to the digester 30. The wet separated solids obtained from solids separator 52 containing 40 percent solids and 6.32 tons solids are spread on a conventional sand bed where they rapidly drain dry to a friable cake at a rate many times faster than conventional digester sludge.

In a variation of the above process, the separated effluent from the oxidized mixture, having a pH of 4.3, is mixed with 2 to 8 g. of $Ca(OH)_2$ per liter of mixture or equivalent amount of other base, and 10 to 20 percent of the water then evaporated therefrom, thereby permitting from 85–98 percent of the ammoniacal nitrogen to escape with the vapors in vapor separator 50, which increases gas production of the digester in addition to increasing percent C.O.D. reduction, the result regularly achieved by the present process. In a continuous run, the ammoniacal nitrogen level of the contents of the digester is measured at daily intervals and the amount of base added to the hot oxidized mixture is varied in direct response to variations of the level. When the ammoniacal nitrogen level approaches 1.0 g./l., enough base is added to raise the pH to from 7–11 or even higher. When the level drops to below 0.8 g./l. the addition of the base is stopped.

In another variation, the sludge-air mixture is oxidized at a temperature between 120 and 150° C. with the heat necessary to maintain that temperature being provided by steam, added directly or indirectly to the hot sludge-air mixture just prior to entering the reactor. The separated effluent, containing about 5 g./l. or less volatile solids when the oxidation temperature is 120° C. and about 17 g./l. or more when the oxidation temperature is 150° C., or above, contains from 0.2 to 0.5 g./l. ammoniacal nitrogen and is a substantially superior nutrient for the digester than effluent resulting from oxidations at above 150° C.

In another variation, at least a portion of the effluent obtained from the solids separator 52 is passed directly to the primary system, the amount by-passing the digester being regulated in relationship to the closeness to 1.0 g./l. of the ammoniacal nitrogen content of the digester.

In another variation of the above-described process, sludge pumping rate is increased so that the sludge-air ratio is sufficient to permit only a 27 percent oxidation and the residence time in the reactor is reduced so that a 25 percent rather than 50 percent oxidation is achieved. The additional heat energy necessary to maintain the same oxidation temperature was provided by steam supplied by a separate heat exchanger in the heat exchange system.

In a further variation, the sludge-air mixture is pumped through the heat exchange system at an average temperature of 120 to 160° C. with a dwell time of 16 to 0.25 hours, the minimum time being that which decreases by at least half the settling time of the suspended solids. The hot mixture is passed to an insulated solids separator, of the type shown in the drawing, where enough solids are removed and passed to the sand bed to reduce the volatile solids content to less than 40 g./l. The hot residual mixture is then passed to the reactor with enough air so that substantially complete oxidation takes place, e.g., at about 200–350° C. When at least 20 g./l. of volatile solids are oxidized the reaction is autogenic. The oxidized mixture is then passed through the heat exchanger system 40 and the vapor separator 50 and then to the primary or aerations systems or directly out of the plant with the final effluent. This variation is useful when digester capacity has been reached, thus necessitating decreased residence times therein. Whereas ordinarily to do this would cause a further loading of the sand beds because of the poorer settling properties of the resulting sludge, in this variation, the settling rate is superior to conventional digester sludge. Moreover, because the effluent is very low in C.O.D., it does not impose an additional disposal load on the system.

What is claimed is:

1. A process for increasing the capacity of a sewage treatment plant comprising an anaerobic digester which comprises the steps of
   (a) oxidizing the digested sludge at at least about 120° C. by wet air oxidation in the presence at all times of excess gaseous oxygen by an amount which reduces by less than 55 percent the Chemical Oxygen Demand of the sludge,
   (b) separating the resulting effluent from the residual solids,
   (c) cooling at least a portion of the effluent to a temperature between about 75° and 108° C., which, when the cooled effluent is returned to the digester, maintains the digester at a substantially constant selected temperature between about 30° and 60° C.,
   (d) returning the partially cooled effluent to the digester,
   (e) regulating the amount of ammoniacal nitrogen returned by the effluent to the digester so as to maintain the ammoniacal nitrogen level of the content of the digester below 1.0 gram per liter.

2. A process for increasing the capacity of a sewage treatment plant comprising an anaerobic digester which comprises the steps of
   (a) oxidizing the digested sludge at at least about 120° C. by wet air oxidation in the presence at all times of excess gaseous oxygen by an amount which reduces by less than 55 percent the Chemical Oxygen Demand of the sludge,
   (b) separating the resulting effluent from the residual solids,
   (c) drying by filtration the separated residual solids,
   (d) cooling at least a portion of the effluent to a temperature between about 75° and 108° C., which, when the cooled effluent is returned to the digester, maintains the digester at a substantially constant selected temperature between about 30° and 60° C.,
   (e) returning the partially cooled effluent to the digester,
   (f) regulating the amount of ammoniacal nitrogen returned by the effluent to the digester so as to maintain the ammoniacal nitrogen level of the content of the digester below 1.0 gram per liter by removing a portion of the ammoniacal nitrogen in the effluent prior to return of the effluent to the digester.

3. A process according to claim 2 wherein the effluent is cooled and ammoniacal nitrogen is separated therefrom by evaporation of a portion of the effluent.

4. A process according to claim 3 wherein a non-volatile base is added to the effluent prior to evaporation.

5. A process for increasing the capacity of a sewage treatment plant comprising an anaerobic digester which comprises the steps of
   (a) oxidizing the digested sludge at from about 120° to 165° C. by wet air oxidation in the presence at all times of excess gaseous oxygen by an amount which reduces by less than 55 percent the Chemical Oxygen Demand of the sludge,
   (b) separating the resulting effluent from the residual solids, (c) drying the separated residual solids,
(d) cooling at least a portion of the effluent to a temperature between about 75° and 108° C., which, when the cooled effluent is returned to the digester, maintains the digester at a substantially constant selected temperature between about 30° and 60° C.,
(e) returning the partially cooled effluent to the digester,
(f) regulating the amount of ammoniacal nitrogen returned by the effluent to the digester so as to maintain the ammoniacal nitrogen level of the content of the digester below 1.0 gram per liter.

6. A process according to claim 5 wherein the oxidation temperature is below about 150° C.

7. A process according to claim 5 wherein the effluent is cooled to between about 80° and 105° C.

8. A process according to claim 5 wherein a portion of the cooled effluent is mixed with digested sludge prior to oxidation of the latter.

References Cited by the Examiner
UNITED STATES PATENTS

| | | | |
|---|---|---|---|
| 2,359,004 | 9/1944 | Schlenz et al. | 210—8 X |
| 3,060,118 | 10/1962 | Shoeffel | 210—3 |

OTHER REFERENCES

Abel et al.: Oxidation and Stabilization of Sewage Sludges With Oxygen at Elevated Temperatures and Pressures, Sewage and Ind. Wastes, vol. 26, December 1954, pp. 1450–1452.

MORRIS O. WOLK, *Primary Examiner.*